United States Patent
Zhang et al.

(10) Patent No.: US 12,363,294 B2
(45) Date of Patent: Jul. 15, 2025

(54) IMAGE COMPRESSION APPARATUS, IMAGE COMPRESSION METHOD, ELECTRONIC DEVICE, AND COMPUTER-READABLE STORAGE MEDIUM

(71) Applicants: HAINING ESWIN COMPUTING TECHNOLOGY CO., LTD., Zhejiang (CN); Beijing ESWIN Computing Technology Co., Ltd., Beijing (CN)

(72) Inventors: Duoduo Zhang, Jiaxing (CN); Benchuan Hu, Jiaxing (CN); Huawen Ding, Jiaxing (CN); Bo Zhao, Jiaxing (CN)

(73) Assignees: HAINING ESWIN COMPUTING TECHNOLOGY CO., LTD., Jiaxing (CN); Beijing ESWIN Computing Technology Co., Ltd., Beijing (CN)

(*) Notice: Subject to any disclaimer, the term of this patent is extended or adjusted under 35 U.S.C. 154(b) by 384 days.

(21) Appl. No.: 18/147,771

(22) Filed: Dec. 29, 2022

(65) Prior Publication Data
US 2023/0254484 A1 Aug. 10, 2023

(30) Foreign Application Priority Data
Feb. 8, 2022 (CN) .......................... 202210119394.7

(51) Int. Cl.
*H04N 19/119* (2014.01)
*H04N 19/167* (2014.01)
(Continued)

(52) U.S. Cl.
CPC ......... *H04N 19/119* (2014.11); *H04N 19/167* (2014.11); *H04N 19/176* (2014.11); *H04N 19/182* (2014.11); *H04N 19/186* (2014.11)

(58) Field of Classification Search
CPC .. H04N 19/119; H04N 19/167; H04N 19/176; H04N 19/182; H04N 19/186; H04N 19/14; H04N 19/146; H04N 19/42
See application file for complete search history.

(56) References Cited

U.S. PATENT DOCUMENTS

| | | | |
|---|---|---|---|
| 10,757,410 B1* | 8/2020 | Hoppe ................. | H04N 19/126 |
| 2015/0170376 A1* | 6/2015 | Bishop .................. | H04N 25/68 |
| | | | 382/167 |

(Continued)

FOREIGN PATENT DOCUMENTS

| | | | | |
|---|---|---|---|---|
| CN | 106126214 A | * | 11/2016 | |
| CN | 111798381 A | * | 10/2020 | ............. G06N 3/045 |

(Continued)

*Primary Examiner* — Amandeep Saini
*Assistant Examiner* — Andrew S Budisalich
(74) *Attorney, Agent, or Firm* — Ladas & Parry, LLP

(57) ABSTRACT

The present disclosure provides an image compression apparatus, an image compression method. The apparatus comprises: an image division module configured to divide a target image into one or more macro blocks; a macro block partitioning module configured to partition each of the macro blocks; a component determination module configured to determine, for each partition, a first component and a second component in each color channel; a color index determination module configured to determine, for each pixel, a color index of the pixel in a corresponding partition according to the first component and the second component; and a compressed code stream obtaining module configured to obtain a preset image compression ratio, and compress the macro block according to the number of partitions of the macro block, the first component and the second component and color indexes of all pixels to obtain a compressed code stream.

13 Claims, 4 Drawing Sheets

(51) Int. Cl.
*H04N 19/176* (2014.01)
*H04N 19/182* (2014.01)
*H04N 19/186* (2014.01)

(56) References Cited

U.S. PATENT DOCUMENTS

2017/0025098 A1* 1/2017 Keramidas ........... H04N 19/176
2020/0228801 A1* 7/2020 Tanner ................. H04N 19/124

FOREIGN PATENT DOCUMENTS

| CN | 112637601 A | * | 4/2021 | ........... H04N 19/124 |
| CN | 113240607 A | * | 8/2021 | |
| CN | 114445549 A | * | 5/2022 | |

* cited by examiner

| 1 | 1 | 1 | 1 |
|---|---|---|---|
| 1 | 1 | 1 | 1 |
| 1 | 1 | 1 | 1 |
| 1 | 1 | 1 | 1 |

| 0 | 0 | 0 | 0 |
|---|---|---|---|
| 0 | 0 | 1 | 1 |
| 1 | 1 | 1 | 1 |
| 1 | 1 | 1 | 1 |

| 10 | 10 | 10 | 10 |
|----|----|----|----|
| 10 | 11 | 11 | 00 |
| 10 | 11 | 11 | 00 |
| 10 | 11 | 11 | 00 |

IMAGE COMPRESSION APPARATUS, IMAGE COMPRESSION METHOD, ELECTRONIC DEVICE, AND COMPUTER-READABLE STORAGE MEDIUM

CROSS-REFERENCE TO RELATED APPLICATIONS

The present disclosure claims priority to Chinese Patent Application No. 202210119394.7, filed to the China National Intellectual Property Administration (CNIPO) on Feb. 8, 2022, the entire disclosure of which is incorporated herein by reference.

TECHNICAL FIELD

The present disclosure relates to the technical field of image compression, and in particular to an image compression apparatus, an image compression method, an electronic device, and a computer-readable storage medium.

BACKGROUND

It is assumed that the size of an original image is 1920*1080, that is, the image includes 1920*1080 pixels. If each pixel is 30 bits, then the memory size required to store the image is (1920*1080*30)/8=7776000 bytes, about 7 M. If the memory size of a chip is 1 G, the chip can only store about 143 images, which seriously wastes memory resources. In order to reduce the waste of memory resources by images, images need to be compressed.

Image compression is to reduce the amount of data required to represent a digital image, and uses a small amount of information to represent the original image. There are mainly two types of existing image compression techniques: 1) compression method based on transform coding: the common transform coding is discrete cosine transform (DCT) in which an image is first divided into blocks, DCT is performed on the data of macro blocks, and then the coefficients are quantized to preserve the low-frequency information of the image as much as possible, and such compression algorithm is complex, the hardware implementation is complex and the cost is high; and 2) compression method based on block truncation coding (BTC), which is essentially a binary compression method, the algorithm is simple and easy to implement, but the compression error is large.

SUMMARY

Embodiments of the present disclosure provide an image compression apparatus, an image compression method, an electronic device, and a computer-readable storage medium.

According to another aspect of the embodiments of the present disclosure, an image compression apparatus is provided, including:
an image division module configured to divide a target image into one or more macro blocks;
a macro block partitioning module configured to partition each of the macro blocks, the pixel distance between any two pixels in different partitions being greater than a preset threshold;
a component determination module configured to determine, for each partition, a first component and a second component of the partition in each color channel;
a color index determination module configured to determine, for each pixel, a color index of the pixel in a corresponding partition according to the first component and the second component of the corresponding partition of the pixel; and
a compressed code stream obtaining module configured to obtain a preset image compression ratio, and for any macro block, compress the macro block according to the number of partitions of the macro block, first and second components of each partition in each color channel, and color indexes of all pixels to obtain a compressed code stream corresponding to the macro block.

In a possible implementation, the macro block partitioning module includes:
a partition center determination sub-module configured to determine a partition center of a previous iteration process;
a sub-module for determining a partition where a pixel is located, configured to, for each pixel, determine the pixel distance between the pixel and each partition center of the previous iteration process, and divide the pixel into a partition where the partition center of the previous iteration process corresponding to the minimum pixel distance is located;
wherein, the partition center of the first iteration process is characterized by a combination of the maximum value of the component of any one color channel, the minimum value of the component of any one color channel, and the mean value of the component of any one color channel of all pixels.

In a possible implementation, the sub-module for determining the partition where a pixel is located further includes:
a mean value determination unit, configured to determine the mean value of components of all pixels in a same partition in each color channel;
a partition center iteration unit configured to update the partition center of the previous iteration process to obtain the partition center of the current iteration process, the partition center of the current iteration process is characterized by the mean value of all pixels in a corresponding partition in each color channel;
a first determination unit for pixel distance—configured to determine the pixel distance between the partition center of the current iteration process and the partition center of the previous iteration process;
a second determination unit for pixel distance, configured to calculate the pixel distance between each pixel and each partition center of the current iteration process if the pixel distance between the partition center of the current iteration process and the partition center of the previous iteration process is greater than a preset threshold; and
a unit for classifying a pixel into a corresponding partition, configured to classify each pixel into a partition where the partition center of the current iteration process corresponding to the minimum pixel distance is located, until the pixel distance between the partition centers of two adjacent iteration processes is less than a preset threshold.

In a possible implementation, the component determination module includes:
a component determination sub-module configured to determine a maximum base pixel value and a minimum base pixel value in the partition, input the maximum base pixel value and the minimum base pixel value respectively into an objective function corresponding to each color channel of the partition to obtain the first component and the second component of the partition in each color channel;

wherein the objective function is obtained by performing straight line fitting on the components of the pixels of the partition in the corresponding color channels.

In a possible implementation, the component determination sub-module includes:

a base pixel value obtaining unit configured to obtain the base pixel value of a corresponding pixel according to an algebraic sum of the components of each pixel in the partition in all color channels; and a unit for determining a maximum base pixel value and a minimum base pixel value, configured to determine a maximum base pixel value and a minimum base pixel value from base pixel values of all pixels in the partition.

In a possible implementation, the color index determination module includes:

a quantized number determination sub-module, configured to determine a quantized number of the macro block according to the number of partitions of the macro block;

a target color channel determination sub-module, configured to determine the target color channel of the pixel in the corresponding partition; and a color index determination sub-module, configured to determine the color index of the pixel in the corresponding partition according to the quantized number of the macro block corresponding to the pixel, the component of the pixel in the target color channel, and the first component and the second component of the target color channel.

In a possible implementation, the target color channel determination sub-module includes:

a first parameter determination unit configured to, for any color channel, obtain a first parameter according to the difference between the component of the pixel in the corresponding color channel and the second component of the partition in the corresponding color channel;

a second parameter determination unit, configured to determine the difference between the first component of the partition in the corresponding color channel and the second component of the partition in the corresponding color channel, to obtain a second parameter;

a third parameter determination unit, configured to obtain a third parameter according to a ratio of the first parameter to the second parameter; and a target color channel determination unit, configured to determine that the color channel corresponding to the maximum third parameter is the target color channel corresponding to the pixel.

In a possible implementation, the color index determination module includes:

a first target parameter determination sub-module, configured to determine the difference between the component of the pixel in the target color channel and the second component of the target color channel to obtain a first target parameter;

a second target parameter determination sub-module, configured to determine the difference between the first component and the second component of the target color channel to obtain a second target parameter;

a third target parameter determination sub-module, configured to determine the ratio of the first target parameter to the second target parameter to obtain a third target parameter; and a color index determination sub-module, configured to determine the color index of the pixel in the corresponding partition according to the third target parameter and the quantized number.

According to a second aspect of embodiments of the present disclosure, an image compression method is provided, the method includes: dividing a target image into one or more macro blocks;

partitioning each of the macro blocks, the pixel distance between any two pixels in different partitions being greater than a preset threshold;

for each partition, determining a first component and a second component of the partition in each color channel;

for each pixel, determining a color index of the pixel in a corresponding partition according to the first component and the second component of the corresponding partition of the pixel; and obtaining a preset image compression ratio, and for any macro block, compressing the macro block according to the number of partitions of the macro block, first and second components of each partition in each color channel, and color indexes of all pixels to obtain a compressed code stream corresponding to the macro block.

In a possible implementation, the partitioning each macro block includes:

determining a partition center of a previous iteration process;

for each pixel, determining a pixel distance between the pixel and each partition center of the previous iteration process, and classifying the pixel into a partition where the partition center of the previous iteration process corresponding to the minimum pixel distance is located;

wherein, the partition center of the first iteration process is characterized by the combination of the maximum value of the component of any one color channel, the minimum value of the component of any one color channel, and the mean value of the component of any one color channel of all pixels.

In a possible implementation, after classifying the pixel into a partition where the partition center of the previous iteration process corresponding to the minimum pixel distance is located, the method further includes:

determining the mean value of components of all pixels in a same partition in each color channel;

updating the partition center of the previous iteration process to obtain the partition center of the current iteration process, the partition center of the current iteration process being characterized by the mean value of all pixels in a corresponding partition in each color channel;

determining the pixel distance between the partition center of the current iteration process and the partition center of the previous iteration process;

calculating the pixel distance between each pixel and each partition center of the current iteration process if the pixel distance between the partition center of the current iteration process and the partition center of the previous iteration process is greater than a preset threshold; and classifying each pixel into a partition where the partition center of the current iteration process corresponding to the minimum pixel distance is located, until the pixel distance between the partition centers of two adjacent iteration processes is less than a preset threshold.

In a possible implementation, the determining a first component and a second component of the partition in each color channel includes:

determining a maximum base pixel value and a minimum base pixel value in the partition, inputting the maximum base pixel value and the minimum base pixel value respectively into an objective function corresponding to each color channel of the partition to obtain a first component and a second component of the partition in each color channel;

wherein the objective function is obtained by performing straight line fitting on the components of the pixels of the partition in the corresponding color channels.

In a possible implementation, determining the color index of the pixel in a corresponding partition according to the first component and the second component of the corresponding partition of the pixel includes:

determining the quantized number of the macro block according to the number of partitions of the macro block; determining the target color channel of the pixel in the corresponding partition; and determining the color index of the pixel in a corresponding partition according to the quantized number of the macro block corresponding to the pixel, the component of the pixel in the target color channel, and the first component and the second component of the target color channel.

According to another aspect of the embodiments of the present disclosure, an electronic device is provided, including a memory, a processor, and a computer program stored in the memory that when executed by the processor causes the device to implement the method provided in the second aspect.

According to still another aspect of the embodiments of the present disclosure, there is provided a non-transitory computer-readable storage medium having a computer program stored thereon that, when executed by a processor, causes the processer to implement the method provided in the second aspect.

According to yet another aspect of the embodiments of the present disclosure, a computer program product is provided, including computer instructions. The computer instructions are stored in a computer-readable storage medium. When the processor of the computer device reads the computer instructions from the computer-readable storage medium, the processor executes the computer instructions to cause the computer device to implement the method provided in the second aspect.

BRIEF DESCRIPTION OF THE DRAWINGS

To describe the technical solutions of the embodiments of the present disclosure more clearly, the drawings to be used in the description of the embodiments of the present disclosure will be described briefly.

DETAILED DESCRIPTION

Figure 1:
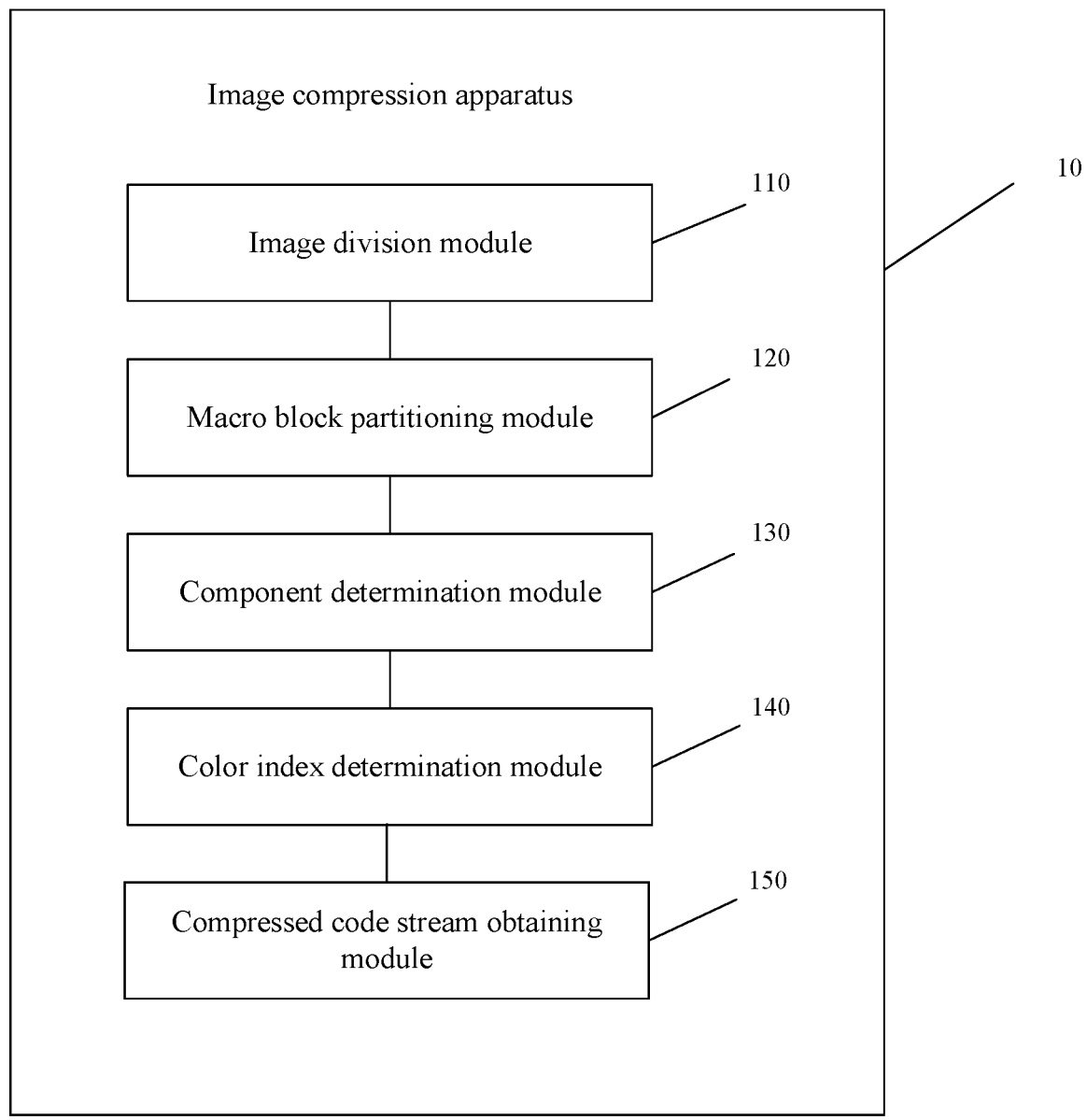
FIG. 1 is a schematic structure diagram of an image compression apparatus according to an embodiment of the present disclosure.

Embodiments of the present disclosure will be described below with reference to the accompanying drawings in the present disclosure. It should be understood that the embodiments to be described below with reference to the accompanying drawings are exemplary descriptions for explaining the technical solutions of the embodiments of the present disclosure, and do not limit the technical solutions of the embodiments of the present disclosure.

It may be understood by those skilled in the art that singular forms "a", "an", "said", and "the" may be intended to include plural forms as well, unless otherwise stated. It should be further understood that the terms "comprising" and "including" used in the embodiments of the present disclosure mean that corresponding features may be implemented as presented features, information, data, steps, operations, elements and/or components, but do not exclude implementations as other features, information, data, steps, operations, elements, components, and/or combinations thereof as supported in the art. It should be understood that, when an element is referred to as being "connected" or "coupled" to another element, this element may be directly connected or coupled to the other element, or this element and the other element may be connected through intervening elements. In addition, "connected to" or "coupled to" as used herein may include wireless connection or coupling. The term "and/or" as used herein indicates at least one of the items defined by the term, e.g., "A and/or B" may be implemented as "A", or as "B", or as "A and B".

To make the purposes, technical solutions, and advantages of the present applicant clearer, the implementations of the present disclosure will be further described below in detail with reference to the accompanying drawings.

First of all, some terms involved in the present disclosure will be introduced and explained below.

Image compression refers to the representation of an original pixel matrix lossy or lossless with fewer bits, also known as image coding. Under the condition of satisfying certain quality, it represents an image or information contained in the image with fewer bits.

Image compression includes lossy compression and lossless compression. Lossless compression is the compression of a file itself. Like the compression of other data files, it is to optimize the data storage method of the file. By using a certain algorithm to represent repeated data information, the file can be fully restored, without affecting the file content. For digital images, there is no loss of image detail.

Lossy compression is a change to an image itself. When saving the image, much brightness information is retained. The information of hue and color purity is merged with the surrounding pixels. Different merging ratio causes different compression ratio. Due to the decreased amount of information, the compression ratio can be very high, and the image quality will be correspondingly decreased.

Basic principles of image compression:

Image data can be compressed because there is redundancy in the data. The redundancy of image data is mainly manifested as: spatial redundancy caused by the correlation between adjacent pixels in the image; temporal redundancy caused by the correlation between different frames in the image sequence; and spectral redundancy caused by the correlation between different color planes or spectral bands. The purpose of data compression is to reduce the number of bits required to represent data by removing these data redundancy. Due to the huge amount of data of the image, it is very difficult to store, transmit and process the image. Therefore, the compression of image data is very important.

Macro block: An image must first be divided into multiple blocks (4*4 pixels) for processing. Obviously, a macro block should be composed of an integer number of blocks. Usually, a macro block is composed of 16*16 or 4*4 pixels. In this solution, the image is preferably divided into 4*4 pixels.

The image compression apparatus, image compression method, electronic device, and computer-readable storage medium according to the present disclosure are intended to solve the above technical problem in the prior art.

The technical solutions of the embodiments of the present disclosure and the technical effects produced by the technical solutions of the present disclosure will be described below by describing several exemplary implementations.

The embodiment of the present disclosure provides an image compression apparatus, as shown in FIG. 1.

The apparatus includes an image division module 110 configured to divide a target image into one or more macro blocks.

The target image in embodiments of the present disclosure is the original image before compression, which may be any single image, or may be any frame of image in a video.

A macro block is the basic unit of coding. In embodiments of the present disclosure, the target image is divided into blocks, and the to-be-processed image is divided into continuous and non-overlapping macro blocks of the same size, for example, each macro block is composed of 4*4 pixels.

It is to be noted that each macro block in embodiments of the present disclosure is independent, and the macro blocks do not depend on each other. That is, the compression of the target image in the subsequent process is actually to compress each macro block independently. Such a compression method makes the code streams corresponding to each macro block independent of each other, which can avoid error propagation.

The apparatus includes a macro block partitioning module 120 configured to partition each macro block. The pixel distance between any two pixels in different partitions is greater than a preset threshold.

In embodiments of the present disclosure, after the target image is divided into blocks to obtain a plurality of macro blocks, each macro block is partitioned to obtain a plurality of partitions.

Pixels are also known as pixel points. An image is composed of several pixels. The components of pixels in each color channel may be represented in the form of space coordinates.

In embodiments of the present disclosure, each pixel includes three color channels. For example, the RGB model has three color channels: R (Red) channel, G (Green) channel, and B (Blue) channel. Of course, the three color channels in embodiments of the present disclosure may also be three channels corresponding to other color models, for example, channels corresponding to three dimensions of the HSV model.

For example, it is assumed that a pixel is described with 3 color channels, that is, the pixel is (r1, b1, c1). It may be interpreted that the component of the pixel in the first color channel is r1, the component of the pixel in the second color channel is b1, and the component of the pixel in the third color channel is c1.

The pixel distance between two pixels may be represented by the sum of the absolute values of the differences between the two pixels in each color channel, or may be represented in other forms, which will not be limited to embodiments of the present disclosure. Specifically, it is assumed that pixel A is (r1, g1, b1) and B is (r2, g2, b2), the pixel distance d between the two pixels can be calculated by the following formula:

$$d=|r1-r2|+|g1-g2|+|b1-b2|$$

where, d is the pixel distance between two pixels, r1 is the component of pixel A in the first color channel, g1 is the component of pixel A in the second color channel, b1 is the component of pixel A in the third color channel; r2 is the component of pixel B in the first color channel, g2 is the component of pixel B in the second color channel, and b2 is the component of pixel B in the third color channel.

In embodiments of the present disclosure, the macro block is partitioned according to the pixel distance between pixels. The pixel distance between any two pixels in a same partition is less than a preset threshold, that is, the pixel distance between any two pixels in a same partition is relatively close. If the pixel distance between two pixels is greater than the preset threshold, the two pixels will be classified into two partitions.

In embodiments of the present disclosure, the macro block is partitioned to obtain multiple partitions, and each partition contains at least one pixel. It is to be noted that, in embodiments of the present disclosure, the macro block is partitioned, and a macro block has at most three partitions. That is, the number of partitions of one macro block may be 1, 2, or 3. For the process of partitioning the macro block, see the following content.

In embodiments of the present disclosure, the quantized number of the macro block is determined according to the number of partitions of the macro block. The quantized number of the macro block may be determined according to the number of partitions. The quantized number is the ratio of the number of pixels in the macro block to the number of partitions of the macro block. It is assumed that the quantized number is N, the number of pixels in the macro block is m, and the number of partitions is q (q=1, 2, 3), then N=m/q. For a macro block with one partition, the quantized number of the macro block may be determined to be 16, for a macro block with two partitions, the quantized number of the macro block is 8, and for a macro block with three partitions, the quantized number of the macro block is 4.

The apparatus includes a component determination module 130 configured to determine, for each partition, a first component and a second component of the partition in each color channel.

In embodiments of the present disclosure, the first component and the second component are determined by the base pixel value. For each partition, the maximum base pixel value and the minimum base pixel value in the partition are determined from the base pixel values of all pixels. The maximum base pixel value and the minimum base pixel value are respectively input into an objective function corresponding to each color channel of the corresponding partition to obtain a first component and a second component of the partition in each color channel, wherein the objective function is obtained by performing straight line fitting on the components of the pixels of the corresponding partition in the corresponding color channels.

In embodiments of the present disclosure, the base pixel value refers to the algebraic sum of the components of the pixel in multiple color channels. Specifically, the component of the pixel C in each color channel may be expressed as (r, g, b), and the base pixel value of pixel C may be obtained: x=r+g+b.

In embodiments of the present disclosure, after the base pixel values of all pixels are determined, the maximum base pixel value $x_{max}$ and the minimum base pixel value $x_{min}$ are determined from the base pixel values of all pixels in the partition.

In embodiments of the present disclosure, each color channel of each partition has its corresponding objective function. The pixels in a same partition are similar or in a linear relationship. The components of the pixels in a same partition in each color channel may be subjected to straight line fitting to obtain the objective function corresponding to each color channel. For the detailed process, see the following sections.

In embodiments of the present disclosure, after determining the objective function of each color channel and the maximum base pixel value and the minimum base pixel value in the partition, the maximum base pixel value and the minimum base pixel value are respectively introduced into each objective function, to obtain the first component and the second component of the partition in each color channel. For the detailed process, see the following sections.

The apparatus includes a color index determination module 140 configured to determine, for each pixel, a color index of the pixel in a corresponding partition according to the first component and the second component of the corresponding partition of the pixel.

In embodiments of the present disclosure, the color index corresponding to each pixel in each partition is determined by calculating the first component and the second component of each partition in each color channel. The component of the pixel in each color channel can be restored by the first component, the second component, and the color index. Then, the first component and the second component of each partition in each color channel are calculated. The component of each pixel in the corresponding color channel must be located between the first component and the second component of the corresponding partition in the corresponding color channel. The color shown by each pixel is affected by multiple color channels. During compression, the target color channel that has the greatest impact on the pixel needs to be determined.

For each pixel, the target color channel corresponding to the pixel is determined according to the component of the pixel in each color channel and the first component and the second component of the partition corresponding to the pixel in each color channel.

Specifically, for any color channel, the difference between the first component and the second component of the partition in the color channel is calculated to obtain a first parameter, the difference between the component of the pixel in the color channel and the minimum color is calculated to obtain a second parameter, a ratio of the second parameter to the first parameter is determined, and a color channel with the largest ratio is determined. The color channel is the target color channel.

In embodiments of the present disclosure, after the target color channel is determined, the color index of the pixel is obtained according to the component of the pixel in the target color channel, the quantized number of the macro block where the pixel is located, and the first component and the second component of the corresponding partition of the pixel in the target color channel.

The color index may be calculated according to the formula $idx=(N-1)*(v-v_2)/(v_1-v_2)$, where idx is the color index, v is the component of the pixel in the target color channel, and $v_1$ is the first component of the pixel partition in the target color channel, $v_2$ is the second component of the pixel partition in the target color channel, N is the quantized number of the macro block and the value of N may be 4, 8 or 16, that is, for a macro block with one partition, the quantized number of the macro block is 16; for a macro block with two partitions, the quantized number of the macro block is 8; and for a macro block with three partitions, the quantized number of the macro block is 4.

Specifically, it is assumed that there is a pixel (100, 80, 90), that is, the components of the pixel in the three color channels are 100, 80, and 90, respectively. The first component and the second component of the partition where the pixel is located in the first color channel are 100 and 30, respectively, then the color index is (100−30)/(100−30)=1; the first component and the second component of the partition in the second color channel are 100 and 20, respectively, then the color index is (80−20)/(100−20)=4/5; and the first component and the second component of the partition in the third color channel are 150 and 60, respectively, then the color index is (90−60)/(150−60)=1/3. Then, the target color channel is the first color channel.

The macro block of the pixel has one partition and it may be determined that the corresponding quantized number of the macro block of the pixel is 16, then the quantized index of the pixel in the corresponding partition may be idx=(16−1)*(100−30)/(100−30)=15. Then, it may be determined that the quantized index of the pixel is 15.

The color index in the present disclosure is an index established on the target color channel, and the target color channel is the color channel that has the greatest impact on the pixel. Using the color index on the target color channel to replace the indexes on other color channels can effectively reduce the errors caused by scaling. This is simpler than the calculation of the color index by interpolation or by the minimum distance.

If the first component and the second component of the partition where a pixel is located in each color channel and the color index of the pixel are known, the component of the pixel in each color channel may be restored by the first component and the second component of the corresponding partition of the pixel in each color channel and the color index of the pixel. The component of the pixel in each color channel may be restored by $v=idx*(v_1-v_2)/(N-1)+v_2$, where idx is the color index of the pixel, $v_1$ and $v_2$ respectively represent the first component and the second component of the corresponding partition of the pixel in a certain color channel, N is the quantized number of the macro block, and N is 4, 8 or 16.

Continuing the above example, the quantized index of a pixel is 15, the first component and the second component of the partition where the pixel is located in the first color channel are 100 and 30, the first component and the second component of the partition in the second color channel are 100 and 20, and the first component and the second component of the partition in the third color channel are 150 and 60. The three components obtained after restoring the components of the pixel in the three color channels are 100, 100, and 150, respectively, which have certain pixel distances from the above components, i.e., 100, 80, and 90, of the pixel in the three color channels. Therefore, it may be determined that, in the present disclosure, there is certain loss by using the color index of one color channel to compress the image. This is lossy compression. However, in the present disclosure, the color index is the index on the target color channel and the target color channel is a color channel that has the greatest impact on the pixel, therefore, the replacement of the indexes on other color channels by the color index on the target color channel can effectively reduce the error caused by scaling.

The apparatus includes a compressed code stream obtaining module 150 configured to obtain a preset image compression ratio, and for any macro block, compress the macro block according to the number of partitions of the macro block, first and second components of each partition in each color channel and color indexes of all pixels to obtain a compressed code stream corresponding to the macro block.

The image compression ratio preset in embodiments of the present disclosure refers to the compression ratio expected by the user. The image compression ratio is the ratio of the compressed code stream of the target image to the original code stream of the target image. For example, the compression ratio is 1:3. That is, the compressed code stream of the target image is ⅓ of the original code stream of the target image. In this way, the compression of the target image is realized. In embodiments of the present disclosure, the target image is divided into one or more macro blocks, and the image compression ratio is also the macro block compression ratio, that is, the image compression ratio is also the ratio of the compressed code stream of the macro block to the original code stream of the macro block.

In embodiments of the present disclosure, after the preset image compression ratio is determined, the number of partitions in the macro block, the first component and the second component of each partition in each color channel, and the color index pairs of all pixels are determined to be pushed into the bit length required by the respective code streams.

Specifically, a first identifier may be set for the number of partitions of the macro block. For a macro block with one partition, the first identifier is set to 00, which occupies 2 bits. For a macro block with two partitions, the first identifier is set to 01, which occupies 2 bits. For a macro block with 3 partitions, the first identifier is set to 1, which occupies 1 bit. It may be understood that, when the first identifier is pressed into the code stream, first, the first bit of the code stream may be determined. If the first bit is 0, it is determined that there is one partition or two partitions, and then the second bit is determined. If the second bit is 0, it is determined that there is one partition; and if the second bit is 1, it is determined that there are two partitions. If the first bit is 1, it is determined that there are three partitions.

Similarly, a partition index may be set for each pixel. The partition index may be the partition number corresponding to the pixel partition. For a macro block with one partition, the partition index may not be set to save the code stream and occupy 0 bit. For a macro block with two partitions, the partition index of each pixel is either 1 or 0, then it is determined that 16 bits are needed to store the partition index of each pixel. For a macro block with three partitions, the partition index of each pixel is any of 00, 01, or 10, then it is determined that 32 bits are needed to store the partition index of each pixel.

It needs 10 bits to push the component of each pixel of the target image in each color channel into the code stream. Each pixel has components in three color channels. It needs 30 bits to push the components of each pixel in the color channels into the code stream. For a 4*4 macro block, it needs 480 bits to push the components of all pixels in the macro block in the color channels into the code stream. The compression ratio of the image in embodiments of the present disclosure is 4:15, that is, the compressed code stream corresponding to the target image needs to be realized as 128 bits.

Continuing the above example, the bits needed for pushing the flag bit corresponding to the number of partitions, the partition index, and the color index into the code stream have been determined. By subtracting the bits needed for pushing the number of partitions, the partition index, and the color index into the code scream from the total bits of the compressed code stream, bits corresponding to the first component and the second component of each partition in each color channel are obtained. For a macro block with one partition, it needs 10 bits to push the first component and the second component of this partition in each color channel into the code stream. For a macro block with two partitions, it needs 5 bits to push the first component and the second component of each partition in each color channel into the code stream (5 most significant bits, and this bit needs to be shifted to the left by 5 bits when restoring the component of the pixel in each color channel). For a macro block with three partitions, it needs 4 bits to push the first component and the second component of each partition in each color channel into the code stream (4 most significant bits, and this bit needs to be shifted to the left by 6 bits when restoring the component of the pixel in each color channel).

After determining the bits needed for pushing the flag bit corresponding to the number of partitions, the partition index, the color index, and the first component and the second component of each partition in each color channel into the code stream, according to a preset order, for example: the flag bit corresponding to the number of partitions, then the partition index, then the color index, and then the first component and the second component of each partition in each color channel into the code stream, the flag bit corresponding to the number of partitions, the partition index, the color index, and the first component and the second component of each partition in each color channel into the code stream are respectively pushed into the code stream.

In embodiments of the present disclosure, after the first component and the second component of the partition in each color channel and the color indexes of all pixels are determined, each partition is compressed to obtain the compressed code stream of the partition. Then, the compressed code streams of the partitions are combined to obtain the compressed code stream of the macro block. When combining the code streams of the partitions, the index corresponding to each pixel needs to be determined, and the index corresponding to each pixel is pushed into the code stream. For an entire macro block, the code stream of the macro block includes the following information: the number of partitions, the partition index of each pixel, the first component and the second component of each partition in each color channel, and the color index of each pixel.

In embodiments of the present disclosure, different coding modes may be set for different numbers of partitions, and the coding modes include formats that are set for the number of bits occupied by the first identifier corresponding to the number of partitions, the number of bits occupied by the partition index of each pixel, the number of bits occupied by the first component and the second component in each color channel, and the number of bits occupied by the color index of each pixel.

In fact, in embodiments of the present disclosure, after determining the number of partitions of a macro block, the coding mode corresponding to the macro block can be directly determined. For a macro block with one partition, the corresponding coding mode is mode1. For a macro block with two partitions, the corresponding coding mode is mode2. For a macro block with three partitions, the corresponding coding mode is mode3. By determining the number of partitions of each macro block, the coding mode corresponding to each macro block can be determined without restoring the errors to judge which compression mode to choose. Restoring the errors to determine the compression mode needs to determine the error respectively corresponding to each pixel. Although this compression method reduces the compression error to a certain extent, this method requires large calculation amount, many coding modes, and complicated hardware implementation. In embodiments of the present disclosure, the compression mode of the macro block is directly determined according to the number of partitions. Each macro block corresponds to only one compression mode, and the compression method is relatively simple. For a macro block with many colors, there are many partitions. The compression error is relatively small. This method can achieve a compression error similar to that of the above-mentioned method for determining the compression mode by restoring the error.

In the embodiments of the present disclosure, the components of all pixels in an entire partition in each color channel are characterized by the first component and the second component of each partition in each color channel and the color index of each pixel, resulting in small calculation amount and simple implementation process. In addition, the color indexes of each pixel are respectively on the corresponding target color channels, and the component of each pixel has the largest proportion on the target color channel, which can effectively reduce the compression error.

An embodiment of the present disclosure provides a possible implementation. The macro block partitioning module includes:
  a partition center determination sub-module configured to determine a partition center of the previous iteration process;
  a sub-module for determining the partition where a pixel is located, configured to, for each pixel, determine the pixel distance between the pixel and each partition center of the previous iteration process, and divide the pixel into a partition where the partition center of the previous iteration process corresponding to the minimum pixel distance is located;
  wherein, the partition center of the first iteration process is characterized by the combination of the maximum value of the component of any one color channel, the minimum value of the component of any one color channel, and the mean value of the component of any one color channel.

In embodiments of the present disclosure, partitioning macro blocks is a repeated iteration process in which the partition center of the first iteration process is characterized by the combination of the maximum value of the component of any one color channel, the minimum value of the component of any one color channel, and the mean value of the component of any one color channel.

Specifically, the component of each pixel in each color channel is obtained, and the component of each pixel in each color channel is shifted to the right by a first preset bit length. Specifically, the initial length of the component of each pixel in each color channel is 10 bits, the first preset bit length is 4, that is, there are 6 bits left after the right shift.

In embodiments of the present disclosure, the bits of the component of each pixel in each color channel are shifted to the right. This can reduce the bit width in the calculation process, remove the influence of the fine pixel distance between pixels, and improve the accuracy of partitioning, thereby reducing the overdrive compression error, and making the partitioning result more stable and reliable.

In embodiments of the present disclosure, after the bits of the component of each pixel in each color channel are shifted, the maximum value, the minimum value, and the mean value of the components of all pixels in each color channel are determined, i.e., Rmin, Rmean, Rmax, Gmin, Gmean, Gmax, Bmin, Bmean, Bmax, where R, G, and B represent different color channels. In this way, the partition center of the first iteration process can be generated: (Rmax, Gmean, Bmin), (Rmean, Gmin, Bmax), (Rmin, Gmax, Bmean). That is, the partition center of the first iteration process is characterized by the combination of the maximum value of the components of all pixels in any color channel, the minimum value of the components in any color channel, and the mean value of the components in any color channel. In this way, three partition centers in the first iteration process can be generated.

In embodiments of the present disclosure, the partition center of the first iteration process is characterized by the maximum value of the components of all pixels in any one color channel, the minimum value of the components in any one color channel, and the mean value of the components in any one color channel, so that the three partition centers of the first iteration process are relatively scattered and can cover all pixels.

In embodiments of the present disclosure, after the three partition centers in the previous iteration process are determined, the pixel distance (also called difference) between each pixel and each partition center is determined. It is assumed that each pixel in the macro block is $(r_i, g_i, b_i)$ and each partition center is $(r_j, g_j, b_j)$, the pixel distance between each pixel and each partition center is as follows:

$$d=|r_i-r_j|+|g_1-g_1|+|b_1-b_1|, (i=0-15, j=0-2)$$

where d represents the pixel distance between each pixel i and the partition center j, $r_i$ represents the component of a pixel in the macro block in the first color channel, $g_i$ represents the component of a pixel in the macro block in the second color channel, $b_i$ represents the component of a pixel in the macro block in the third color channel, $r_j$ represents the component of a partition center in the first color channel, $g_j$ represents the component of a partition center in the second color channel, and b3 represents the component of a partition center in the third color channel.

In embodiments of the present disclosure, after calculating the pixel distance between each pixel and each partition center, the pixel distances are shifted to the right by a second bit length. Specifically, in embodiments of the present disclosure, the pixel distances may be shifted to the right by 3 bits, that is, d>>3 (>> means shifting to the right), and the minimum pixel distance is determined from the pixel distances after shifting to the right. The smaller the pixel distance is, the more similar the two are. In embodiments of the present disclosure, after determining the minimum pixel distance, the pixel is classified into the partition where the partition center corresponding to the minimum pixel distance is located.

An embodiment of the present disclosure provides a possible implementation. The sub-module for determining the partition where a pixel is located further includes:
- a mean value determination unit, configured to determine the mean value of components of all pixels in a same partition in each color channel;
- a partition center iteration unit configured to update the partition center of the previous iteration process to obtain the partition center of the current iteration process, the partition center of the current iteration process is characterized by the mean value of all pixels in a corresponding partition in each color channel;
- a pixel distance first-determination unit configured to determine the pixel distance between the partition center of the current iteration process and the partition center of the previous iteration process;
- a second determination unit for pixel distance, configured to calculate the pixel distance between each pixel and each partition center of the current iteration process if the pixel distance is greater than a preset threshold; and
- a unit for classifying a pixel into a corresponding partition, configured to classify each pixel into a partition where the partition center of the current iteration process corresponding to the minimum pixel distance is located, until the pixel distance between the partition centers of two adjacent iteration processes is less than a preset threshold.

In embodiments of the present disclosure, after each pixel is classified into the partition where the previous iteration process corresponding to the minimum pixel distance is located, the mean value of all pixels in the same partition in each color channel is determined. In practical applications, a partition number may be set for each partition center, and a partition index may be set for each pixel. The partition index is the partition number corresponding to the partition center, which is used to represent the partition to which the pixel belongs.

It is assumed that the partition centers of the previous iteration process are A, B, and C respectively, wherein the partition number of A is 00, the partition number of B is 01, and the partition number of C is 11. If the partition indexes of pixels in a macro block include any one of 00, 01, and 11, it may be determined that the macro block has only one partition; if the partition indexes of pixels in a macro block include any two of 00, 01 and 11, then it is determined that the macro block has two partitions; and if the partition indexes of pixels in a macro block include 00, 01 and 11, it is determined that the macro block has three partitions.

In embodiments of the present disclosure, after the partition to which each pixel belongs is determined, the mean value of all pixels in the same partition in each color channel is determined.

In embodiments of the present disclosure, after determining the mean value of all pixels in the same partition in each color channel, the partition center of the previous iteration process is updated to obtain the partition center of the current iteration process, and the partition center of the current iteration process is characterized by the mean value of the corresponding partition center in each color channel.

In embodiments of the present disclosure, after updating the partition center of the previous iteration process, the partition center of the current iteration process is obtained. At this time, the pixel distance between the partition center of the current iteration process and the partition center of the previous iteration process needs to be calculated. The pixel distance is used to determine whether each partition center tends to be stable, and then to determine whether the partitioning of the macro block tends to be stable.

If the pixel distance between the partition center of the current iteration process and the partition center of the previous iteration process is greater than the preset threshold, for example that may be 16, it may be determined that the partition center of the current iteration process does not tend to be stable. It is necessary to calculate the pixel distance between each pixel and the partition center of the current iteration process again, and classify each pixel into the partition where the partition center of the current iteration process corresponding to the minimum pixel distance is located, until the pixel distance between the partition centers of two adjacent iteration processes is less than the preset threshold.

In embodiments of the present disclosure, when the pixel distance between the partition centers of two adjacent iteration processes is less than a preset threshold, it is determined that each partition center tends to be stable.

Figure 2:
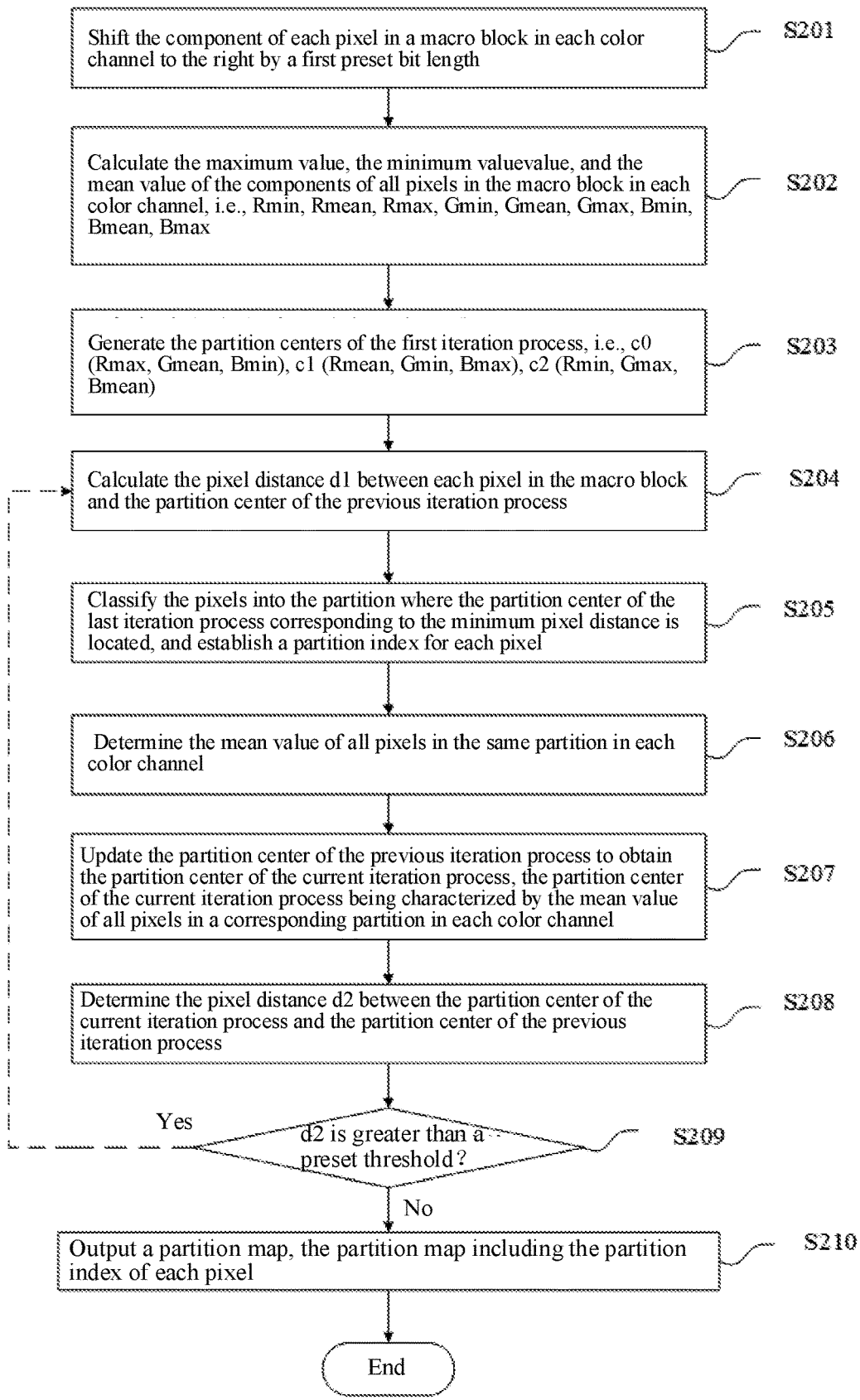
FIG. 2 is a schematic flowchart of partitioning a macro block according to an embodiment of the present disclosure.

As shown in FIG. 2, a schematic flowchart of partitioning a macro block is exemplarily shown, including the following steps:
- S201: shifting the component of each pixel in a macro block in each color channel to the right by a first preset bit length;
- S202: calculating the maximum value, the minimum value, and the mean value of the components of all pixels in the macro block in each color channel, i.e., Rmin, Rmean, Rmax, Gmin, Gmean, Gmax, Bmin, Bmean, Bmax;
- S203: generating the partition centers of the first iteration process, i.e., c0 (Rmax, Gmean, Bmin), c1 (Rmean, Gmin, Bmax), c2 (Rmin, Gmax, Bmean);
- S204: calculating the pixel distance d1 between each pixel in the macro block and the partition center of the previous iteration process;
- S205: classifying the pixels into the partition where the partition center of the last iteration process corresponding to the minimum pixel distance is located, and establishing a partition index for each pixel;
- S206: determining the mean value of all pixels in the same partition in each color channel;
- S207: updating the partition center of the previous iteration process to obtain the partition center of the current iteration process, the partition center of the current iteration process being characterized by the mean value of all pixels in a corresponding partition in each color channel;
- S208: determining the pixel distance d2 between the partition center of the current iteration process and the partition center of the previous iteration process;
- S209: determining whether the pixel distance d2 is greater than a preset threshold; if so, repeating steps S204 to S209; and
- S210: if not, outputting a partition map; the partition map including the partition index of each pixel.

Figures 3A, 3B, 3C, 4:
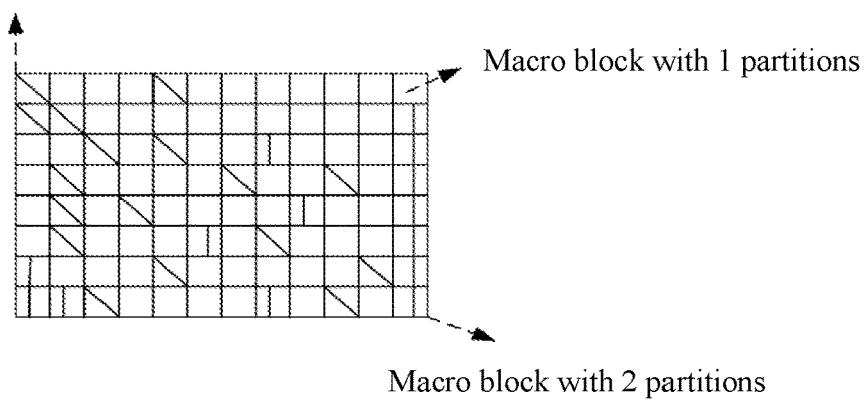
FIG. 3a is a schematic diagram of a partition map corresponding to a macro block containing one partition according to an embodiment of the present disclosure.
FIG. 3b is a schematic diagram of a partition map corresponding to a macro block containing two partitions according to an embodiment of the present disclosure.
FIG. 3c is a schematic diagram of a partition map corresponding to a macro block containing three partitions according to an embodiment of the present disclosure.
FIG. 4 is a schematic diagram of the number of corresponding partitions of each macro block of a target image according to an embodiment of the present disclosure.

As shown in FIG. 3a, a partition map corresponding to a macro block containing one partition is exemplarily shown. The partition indexes of all pixels are the same.

As shown in FIG. 3b, a partition map corresponding to a macro block containing two partitions is exemplarily shown. The partition index of some pixels is 1 and the partition index of some pixels is 0.

As shown in FIG. 3c, a partition map corresponding to a macro block containing three partitions is exemplarily shown. The partition index of some pixels is 00, the partition index of some pixels is 10, and the partition index of some pixels is 11.

or a macro block with one partition, there is no need to push its corresponding partition map into the code stream; for a macro block with two partitions, the partition index of each pixel needs to be represented by 0 or 1, and it needs 16 bits to push the partition map into the code stream; and for a macro block with three partitions, the partition index of each pixel needs to be represented by 00 or 01 or 11, and it needs 32 bits to push the partition map into the code stream.

An embodiment of the present disclosure provides a possible implementation. The component determination module includes:

a component determination sub-module configured to determine a maximum base pixel value and a minimum base pixel value in the partition, input the maximum base pixel value and the minimum base pixel value respectively into an objective function corresponding to each color channel of the partition to obtain a first component and a second component of the partition in each color channel;

wherein the objective function is obtained by performing straight line fitting on the components of the pixels of the partition in the corresponding color channels.

In embodiments of the present disclosure, the base pixel value refers to the algebraic sum of the components of a pixel in multiple color channels. Specifically, if the component of the pixel C in each color channel is denoted by (r, g, b), the base pixel value of the pixel C may be: x=r+g+b.

In embodiments of the present disclosure, after the base pixel values of all pixels are determined, the maximum base pixel value $x_{max}$ and the minimum base pixel value $x_{min}$ are determined from the base pixel values of all pixels in the partition.

The objective function In embodiments of the present disclosure includes:

$R=a_0*x_m+b_0$ $G=a_1*x_m+b_1$ $B=a_2*x_m+b_2$ where R, G and B are the first component or the second component in each color channel respectively, and $x_m$, means that x is the maximum base pixel value or the minimum base pixel value. Specifically, the maximum base pixel value $x_{max}$ is input to $R=a_0*x_m+b_0$ to obtain the first component of the partition in the R color channel; and the minimum base pixel value $x_{min}$ is input to R=a0*xm+b0 to obtain the second component of the partition in the R color channel. Thus, the first component and the second component of the partition in each color channel are obtained.

$a_0$, $a_1$, $a_2$, $b_0$, $b_1$, and $b_2$ in the above objective functions are determined by the following formulas:

$a_0=SUM_{rx}*m-SUM_x*SUM_r$, $b_0=SUM_{xx}*SUM_r-SUM_x*SUM_{rx}$, $a_1=SUM_{gx}*m-SUM_x*SUM_g$, $b_1=SUM_{bx}*SUM_g-SUM_x*SUM_{gx}$, $a_2=SUM_{bx}*m-SUM_x*SUM_b$, $b_2=SUM_{xx}*SUM_b-SUM_x*SUM_{bx}$, where x represents the maximum base pixel value or the minimum base pixel value, r, g and b represent the color channels, $SUM_r$, $SUM_g$, $SUM_b$ respectively represent the algebraic sum of the components in each color channel, $SUM_x$ represents the algebraic sum of all base pixel values, $SUM_{rx}$, $SUM_{gx}$, and $SUM_{bx}$ represent the algebraic sum of the products of the components in each color channel and the base pixel value, respectively, and $SUM_{xx}$ represents the algebraic sum of the quadratic power results of all base pixel values. The formulas for calculating $SUM_r$, $SUM_g$, $SUM_b$, $SUM_x$, $SUM_{rx}$, $SUM_{gx}$, $SUM_{bx}$, and $SUM_{xx}$ are as follows:

$$SUM_r = \sum_{i=0}^{m-1} r_i, \; SUM_g = \sum_{i=0}^{m-1} g_i, \; SUM_b = \sum_{i=0}^{m-1} b_i, \; SUM_x = \sum_{i=0}^{m-1} x_i$$

$$SUM_{rx} = \sum_{i=0}^{m-1} r_i * x_i, \; SUM_{gx} = \sum_{i=0}^{m-1} g_i * x_i,$$

$$SUM_{bx} = \sum_{i=0}^{m-1} b_i * x_i \; SUM_{xx} = \sum_{i=0}^{m-1} x_i * x_i$$

where, m is the number of pixels in a sub-region, i represents the ith pixel, and r, g, and b represent color channels.

In embodiments of the present disclosure, after $SUM_r$, $SUM_g$, $SUM_b$, $SUM_x$, $SUM_{rx}$, $SUM_{gx}$, $SUM_{bx}$ and $SUM_{xx}$ are determined, they are substituted into the following formulas:

$a_0=SUM_{rx}*m-SUM_x*SUM_r$, $b_0=SUM_{xx}*SUM_r-SUM_x*SUM_{rx}$, $a_1=SUM_{gx}*m-SUM_x*SUM_g$, $b_1=SUM_{bx}*SUM_g-SUM_x*SUM_{gx}$, $a_2=SUM_{bx}*m-SUM_x*SUM_b$, $b_2=SUM_{xx}*SUM_b-SUM_x*SUM_{bx}$,

The values of $a_0$, $b_0$, $a_1$, $b_1$, $a_2$, and $b_2$ are obtained, and these values are substituted into the objective function for each color channel:

$R=a_0*x_m+b_0$ $G=a_1*x_m+b_1$ $B=a_2*x_m+b_2$

Then, the objective function corresponding to each color channel can be obtained. Then, the maximum base pixel value $x_{max}$ and the minimum base pixel value $x_{min}$ are substituted into the objective function to obtain the first component and the second component of each partition in each color channel. The first component and the second component of the partition in each color channel are obtained, respectively, $R_1$ and $R_2$, $G_1$ and $G_2$, $B_1$ and $B_2$. Combining the first components in each color channel can obtain the first partition color as $(R_1, G_1, B_1)$, and combining the second components in each color channel can obtain the second partition color as $(R_2, G_2, B_2)$. $R_1$ and $R_2$ are the first component and the second component in a same color channel; $G_1$ and $G_2$ are the first component and the second component in a same color channel; and $B_1$ and $B_2$ are the first component and the second component in a same color channel.

In embodiments of the present disclosure, straight line fitting is performed by using the base pixel value as the base axis to obtain the objective function. The result is stable, it is noise resistant, the accuracy of the fitted straight line is improved, and the implementation process is simpler and more efficient than using the component of one of the color channels as the base axis.

An embodiment of the present disclosure provides a possible implementation. The component determination sub-module includes:
- a base pixel value obtaining unit configured to obtain the base pixel value of a corresponding pixel according to the algebraic sum of the components of each pixel in the partition in all color channels; and
- a unit for determining a maximum base pixel value and a minimum base pixel value, configured to determine a maximum base pixel value and a minimum base pixel value from base pixel values of all pixels in the partition.

In embodiments of the present disclosure, the base pixel value refers to the algebraic sum of the components of the pixel in multiple color channels. Specifically, the component of the pixel C in each color channel is (r, g, b), and the base pixel value of the pixel C may be obtained: x=r+g+b.

In embodiments of the present disclosure, after the base pixel values of all pixels are determined, the maximum base pixel value $x_{max}$ and the minimum base pixel value $x_{min}$ are determined from the base pixel values of all pixels in the partition. This will not be repeated here.

An embodiment of the present disclosure provides a possible implementation. The color index determination module includes:
- a quantized number determination sub-module, configured to determine a quantized number of the macro block according to the number of partitions of the macro block;
- a target color channel determination sub-module, configured to determine the target color channel of the pixel in the corresponding partition; and
- a color index determination sub-module, configured to determine the color index of the pixel in a corresponding partition according to the quantized number of the macro block corresponding to the pixel, the component of the pixel in the target color channel, and the first component and the second component of the target color channel.

In embodiments of the present disclosure, the quantized number of the macro block is determined according to the number of partitions of the macro block. The quantized number of the macro block may be determined according to the number of partitions. The quantized number is the ratio of the number of pixels in the macro block to the number of partitions of the macro block. It is assumed that the quantized number is N, the number of pixels in the macro block is m, and the number of partitions is q (q=1, 2, 3), then N=m/q. For a macro block with one partition, the quantized number of the macro block may be determined to be 16, for a macro block with two partitions, the quantized number of the macro block is 8, and for a macro block with three partitions, the quantized number of the macro block is 4.

In embodiments of the present disclosure, there are multiple color channels. For any color channel, the difference between the first component and the second component of the partition in the color channel is calculated to obtain a first parameter, the difference between the component of the pixel in the color channel and the minimum color is calculated to obtain a second parameter, a ratio of the second parameter to the first parameter is determined, and a color channel with the largest ratio is determined. The color channel is the target color channel.

In embodiments of the present disclosure, after the target color channel is determined, the color index of the pixel is obtained according to the component of the pixel in the target color channel, the quantized number of the macro block where the pixel is located, and the first component and the second component of the corresponding partition of the pixel in the target color channel.

The color index may be calculated according to the formula $idx=(N-1)*(v-v_2)/(v_1-v_2)$, where idx is the color index, v is the component of the pixel in the target color channel, and $v_1$ is the first component of the pixel partition in the target color channel, $v_2$ is the second component of the pixel partition in the target color channel, and N is the quantized number of the macro block.

By substituting the component of each pixel in the target color channel, the first component and the second component of the target color channel, and the quantized number of the macro block into the above formula, the quantized index of each pixel can be calculated, and it may be determined that $(v-v_2)/(v_1-v_2)$ is less than or equal to 1, then idx<=N-1. For a macro block with one partition, the quantized number is N=16, then the color index of each pixel in the macro block is at most 15, so it is determined that 4 bits are needed to store the partition index of each pixel and 64 bits are needed to store the color indexes of 16 pixels. For a macro block with two partitions, the quantized number is N=18, then the color index of each pixel in the macro block is at most 7, so it is determined that 3 bits are needed to store the partition index of each pixel and 64 bits are needed to store the color indexes of 16 pixels. For a macro block with three partitions, the quantized number is N=4, then the color index of each pixel in the macro block is at most 3, so it is determined that 2 bits are needed to store the partition index of each pixel and 32 bits are needed to store the color indexes of 16 pixels.

An embodiment of the present disclosure provides a possible implementation. The target color channel determination sub-module includes:
- a first parameter determination unit configured to, for any color channel, obtain a first parameter according to the difference between the component of the pixel in the corresponding color channel and the second component of the partition in the corresponding color channel;
- a second parameter determination unit, configured to determine the difference between the first component of the partition in the corresponding color channel and the second component of the partition in the corresponding color channel, to obtain a second parameter;
- a third parameter determination unit, configured to obtain a third parameter according to the ratio of the first parameter to the second parameter; and
- a target color channel determination unit, configured to determine that the color channel corresponding to the maximum third parameter is the target color channel.

In embodiments of the present disclosure, the first component and the second component of each partition in each color channel are calculated. The component of a pixel in a corresponding color channel must be located between the first component and the second component of the partition to which it belongs in the corresponding color channel. The color displayed by each pixel is affected by multiple color channels. During the compression, it is necessary to determine the target color channel that has the greatest impact on the pixel.

For any color channel, the difference between the first component and the second component of the partition in the color channel is calculated to obtain a first parameter, the difference between the component of the pixel in the color channel and the minimum color is calculated to obtain a second parameter, a ratio of the second parameter to the first parameter is determined to obtain a third parameter, and a color channel with the largest third parameter is determined. The color channel is the target color channel.

It is assumed that there is a pixel (100, 80, 90), that is, the components of the pixel in the three color channels are 100, 80, and 90, respectively. The first component and the second component of the partition where the pixel is located in the first color channel are 100 and 30, respectively, then the color index is (100−30)/(100−30)=1; the first component and the second component of the partition in the second color channel are 100 and 20, respectively, then the color index is (80−20)/(100−20)=4/5; and the first component and the second component of the partition in the third color channel are 150 and 60, respectively, then the color index is (90−60)/(150−60)=1/3. Then, the target color channel is the first color channel.

An embodiment of the present disclosure provides a possible implementation. The color index determination module includes:
- a first target parameter determination sub-module, configured to determine the difference between the component of the pixel in the target color channel and the second component of the target color channel to obtain a first target parameter;
- a second target parameter determination sub-module, configured to determine the difference between the first component and the second component of the target color channel to obtain a second target parameter;
- a third target parameter determination sub-module, configured to determine the ratio of the first target parameter to the second target parameter to obtain a third target parameter; and
- a color index determination sub-module, configured to determine the color index of the pixel in the corresponding partition according to the third target parameter and the quantized number.

In embodiments of the present disclosure, the first target parameter is the difference between the component of the pixel in the target color channel and the second component of the target color channel; the second target parameter is the difference between the first component and the second component of the target color channel; and the third target parameter is the ratio of the first target parameter to the second target parameter. The color index of the pixel in the corresponding partition may be determined according to the third target parameter and the quantized number.

Specifically, continuing the above example, the color index $idx=(N-1)*[(v-v_2)/(v_1-v_2)]$ has been determined in the embodiment, where v is the component of the pixel in the target color channel, $v_1$ and $v_2$ are the first component and the second component of the target color channel of the partition to which the pixel belongs, N is the quantized number, $(v-v_2)$ is the first target parameter, $(v_1-v_2)$ is the second target parameter, $[(v-v_2)/(v_1-v_2)]$ is the third target parameter, and $(N-1)*[(v-v_2)/(v_1-v_2)]$ is the color index of the pixel.

In embodiments of the present disclosure, by establishing the color index of each pixel in the corresponding partition, it is no longer necessary to store the component of each pixel in each color channel. Compared with storing the component of each pixel in each color channel, storing the color index just needs a small number of bits.

As shown in FIG. 4, a schematic diagram of the corresponding number of partitions of each macro block of the target image is exemplarily shown. As shown, the unfilled macro block has one partition, the macro block filled with oblique lines has three partitions, and the macro block filled with vertical lines has two partitions.

It should be noted that the modules, sub-modules, and units described above maybe implemented by any one of hardware, firmware or software, or a combination thereof. For example, the modules, sub-modules, and units can all be implemented by hardware, for example implemented by circuit. Or, in some embodiments, all the modules, sub-modules, and units can be implemented by software as program modules or set of instructions. Therefore, the apparatus as a whole may be implemented as programs stored in a non-transitory memory. Or, in some embodiments, according to application scenarios, parts of the modules, sub-modules, and units can be implemented by software and parts of the modules, sub-modules, and units can be implemented by hardware or firmware. In that case, the apparatus as a whole may be implemented as a device with hardware (circuit) and storage medium.

Figure 5:
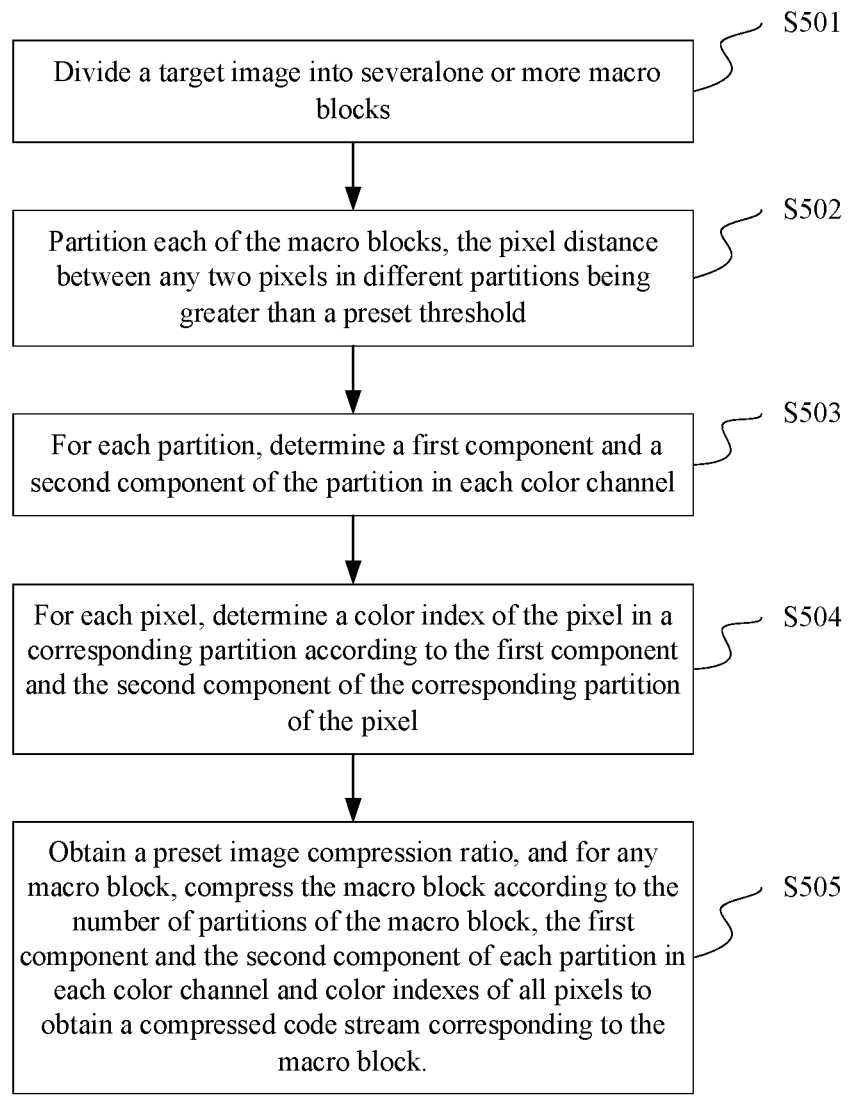
FIG. 5 is a schematic flowchart of an image compression method according to an embodiment of the present disclosure.

An embodiment of the present disclosure provides an image compression method, as shown in FIG. 5, including:
- S501: dividing a target image into one or more macro blocks;
- S502: partitioning each of the macro blocks, the pixel distance between any two pixels in different partitions being greater than a preset threshold;
- S503: for each partition, determining a first component and a second component of the partition in each color channel;
- S504: for each pixel, determining a color index of the pixel in a corresponding partition according to the first component and the second component of the corresponding partition of the pixel; and
- S505: obtaining a preset image compression ratio, and for any macro block, compressing the macro block according to the number of partitions of the macro block, first component and the second component of each partition in each color channel and color indexes of all pixels to obtain a compressed code stream corresponding to the macro block.

In the embodiments of the present disclosure, the components of all pixels in an entire partition in each color channel are characterized by the first component and the second component of each partition in each color channel and the color index of each pixel, resulting in small calculation amount and simple implementation process. In addition, the color indexes of each pixel are respectively on the corresponding target color channels, and the component of each pixel has the largest proportion on the target color channel, which can effectively reduce the compression error.

An embodiment of the present disclosure provides a possible implementation. The partitioning each macro block includes:

determining a partition center of the previous iteration process;

for each pixel, determining the pixel distance between the pixel and each partition center of the previous iteration process, and classifying the pixel into a partition where the partition center of the previous iteration process corresponding to the minimum pixel distance is located;

wherein, the partition center of the first iteration process is characterized by the combination of the maximum value of the component of any one color channel, the minimum value of the component of any one color channel, and the mean value of the component of any one color channel of all pixels.

An embodiment of the present disclosure provides a possible implementation. After classifying the pixel into a partition where the partition center of the previous iteration process corresponding to the minimum pixel distance is located, the method further includes:

determining the mean value of components of all pixels in a same partition in each color channel;

updating the partition center of the previous iteration process to obtain the partition center of the current iteration process, the partition center of the current iteration process being characterized by the mean value of all pixels in a corresponding partition in each color channel;

determining the pixel distance between the partition center of the current iteration process and the partition center of the previous iteration process;

calculating the pixel distance between each pixel and each partition center of the current iteration process if the pixel distance between the partition center of the current iteration process and the partition center of the previous iteration process is greater than a preset threshold; and classifying each pixel into a partition where the partition center of the current iteration process corresponding to the minimum pixel distance is located, until the pixel distance between the partition centers of two adjacent iteration processes is less than a preset threshold.

An embodiment of the present disclosure provides a possible implementation. The determining a first component and a second component of the partition in each color channel includes:

determining a maximum base pixel value and a minimum base pixel value in the partition, inputting the maximum base pixel value and the minimum base pixel value respectively into an objective function corresponding to each color channel of the partition to obtain a first component and a second component of the partition in each color channel;

wherein the objective function is obtained by performing straight line fitting on the components of the pixels of the partition in the corresponding color channels.

An embodiment of the present disclosure provides a possible implementation. The determining the color index of the pixel in a corresponding partition according to the first component and the second component of the corresponding partition of the pixel includes:

determining the quantized number of the macro block according to the number of partitions of the macro block; determining the target color channel of the pixel in the corresponding partition; and determining the color index of the pixel in a corresponding partition according to the quantized number of the macro block corresponding to the pixel, the component of the pixel in the target color channel, and the first component and the second component of the target color channel.

The apparatus of the embodiments of the present disclosure can execute the method of the embodiments of the present disclosure, and the implementation principles thereof are similar. The actions performed by modules in the apparatus of the embodiments of the present disclosure are the same as the steps in the method of the embodiments of the present disclosure. Correspondingly, for the detailed functional description of modules of the apparatus, reference may be made to the description in the corresponding method shown above, and details will not be repeated here.

The technical solutions of the embodiments of the present application have the following beneficial effects. In the embodiments of the present application, a target image is divided into several macro blocks; each of the macro blocks is partitioned, the pixel distance between any two pixels in different partitions being greater than a preset threshold; for each partition, a first component and a second component of the partition in each color channel are determined; for each pixel, a color index of the pixel in a corresponding partition is determined according to the first component and the second component of the corresponding partition of the pixel; and a preset image compression ratio is obtained, and for any macro block, the macro block is compressed according to the number of partitions of the macro block, the first component and the second component of each partition in each color channel and color indexes of all pixels to obtain a compressed code stream corresponding to the macro block. In the embodiments of the present application, the components of all pixels in an entire partition in each color channel are characterized by the first component and the second component of each partition in each color channel and the color index of each pixel, resulting in small calculation amount and simple implementation process. In addition, the color indexes of each pixel are respectively on the corresponding target color channels, and the component of each pixel has the largest proportion on the target color channel, which can effectively reduce the compression error.

An embodiment of the present disclosure provides an electronic device, including a memory, a processor and a computer program stored on the memory, wherein the processor executes the computer program to implement steps of the image compression method. Compared with the related art, in the embodiments of the present disclosure, the components of all pixels in an entire partition in each color channel are characterized by the first component and the second component of each partition in each color channel and the color index of each pixel, resulting in small calculation amount and simple implementation process. In addition, the color indexes of each pixel are respectively on the corresponding target color channels, and the component of each pixel has the largest proportion on the target color channel, which can effectively reduce the compression error.

Figure 6:
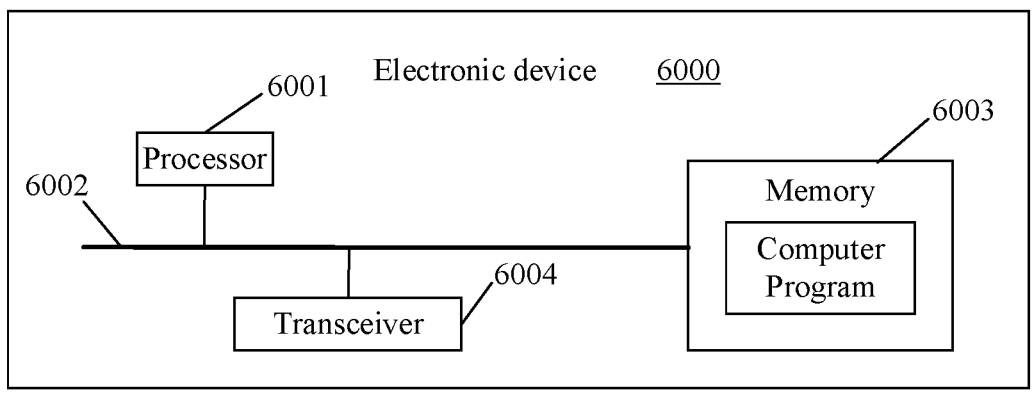
FIG. 6 is a schematic structure diagram of an electronic device according to an embodiment of the present disclosure.

In an optional embodiment, an electronic device is provided. As shown in FIG. 6, the electronic device 6000 shown in FIG. 6 includes a processor 6001 and a memory 6003. The processor 6001 is connected to the memory 6003, for example, through a bus 6002. Optionally, the electronic device 6000 may further include a transceiver 6004, and the transceiver 6004 may be used for data interaction between the electronic device and other electronic devices, for example, data transmission and/or data reception. It should be noted that, in practical applications, the transceiver 6004 is not limited to one, and the structure of the electronic device 6000 does not constitute any limitations to the embodiments of the present disclosure.

The processor 6001 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute various exemplary logical blocks, modules and circuits described in connection with the present disclosure. The processor 6001 may also be a combination for realizing determination functions, for example, a combination of one or more microprocessors, a combination of a DSP and a microprocessor, etc.

The bus 6002 may include a path to transfer information between the components described above. The bus 6002 may be a peripheral component interconnect (PCI) bus, or an extended industry standard architecture (EISA) bus, etc. The bus 6002 may be an address bus, a data bus, a control bus, etc. For ease of presentation, the bus is represented by only one thick line in FIG. 6. However, it does not mean that there is only one bus or one type of buses.

The memory 6003 may be, but is not limited to, read only memories (ROMs) or other types of static storage devices that can store static information and instructions, random access memories (RAMs) or other types of dynamic storage devices that can store information and instructions, may be electrically erasable programmable read only memories (EEPROMs), compact disc read only memories (CD-ROMs) or other optical disk storages, optical disc storages (including compact discs, laser discs, discs, digital versatile discs, blue-ray discs, etc.), magnetic storage media or other magnetic storage devices, or any other media that can carry or store desired programs and that can be accessed by computers.

The memory 6003 is used to store application programs for executing the embodiments of the present disclosure, and is controlled by the processor 6001. The processor 6001 is used to execute the computer programs stored in the memory 6003 to implement the steps of the foregoing method embodiments.

Embodiments of the present disclosure provide a computer-readable storage medium having computer programs stored thereon that, when executed by a processor, implement steps and corresponding contents of the foregoing method embodiments. Compared with the prior art, in the embodiments of the present disclosure, the components of all pixels in an entire partition in each color channel are characterized by the first component and the second component of each partition in each color channel and the color index of each pixel, resulting in small calculation amount and simple implementation process. In addition, the color indexes of each pixel are respectively on the corresponding target color channels, and the component of each pixel has the largest proportion on the target color channel, which can effectively reduce the compression error.

It should be understood that although the steps in the flowchart of the embodiments of the present disclosure are sequentially displayed by following the arrows, these steps are not necessarily performed in the order indicated by the arrows. Unless explicitly stated herein, in some implementation scenarios of the embodiments of the present disclosure, the steps in the flowcharts may be executed in other sequences as required. In addition, based on actual implementation scenarios, some or all of the steps in the flowcharts may include multiple sub-steps or multiple stages. Some or all of the sub-steps or stages may be executed at the same moment of time, and each of the sub-steps or stages may be executed at different moments of time. In scenarios with different execution times, the execution order of these sub-steps or stages may be flexibly configured according to requirements, which is not limited to the embodiments of the present disclosure.

The foregoing descriptions are merely some implementations of the present disclosure. It should be noted that, to a person of ordinary skill in the art, without departing from the technical concept of the solutions of the present disclosure, the use of other similar implementation means based on the technical concept of the present disclosure also belongs to the protection scope of the embodiments of the present disclosure.

What is claimed is:

1. An image compression apparatus, comprising:
    an image division module configured to divide a target image into one or more macro blocks;
    a macro block partitioning module configured to partition each of the macro blocks, the pixel distance between any two pixels in different partitions being greater than a preset threshold;
    a component determination module configured to determine, for each partition, a first component and a second component of the partition in each color channel;
    a color index determination module configured to determine, for each pixel, a color index of the pixel in a corresponding partition according to the first component and the second component of the corresponding partition of the pixel; and
    a compressed code stream obtaining module configured to obtain a preset image compression ratio, and for any macro block, compress the macro block according to the number of partitions of the macro block, the first component and the second component of each partition in each color channel and color indexes of all pixels to obtain a compressed code stream corresponding to the macro block,
    wherein the macro block partitioning module comprises:
    a partition center determination sub-module configured to determine a partition center of a previous iteration process; and
    a sub-module for determining a partition where a pixel is located, configured to, for each pixel, determine the pixel distance between the pixel and each partition center of the previous iteration process, and classify the pixel into a partition where the partition center of the previous iteration process corresponding to a minimum pixel distance is located;
    wherein, the partition center of the first iteration process is characterized by a combination of a maximum value of the component of any one color channel, a minimum value of the component of any one color channel, and a mean value of the component of any one color channel of all pixels.

2. The apparatus according to claim 1, wherein the sub-module for determining the partition where a pixel is located comprises:
    a mean value determination unit, configured to determine the mean value of components of all pixels in a same partition in each color channel;
    a partition center iteration unit configured to update the partition center of the previous iteration process to obtain the partition center of a current iteration process, the partition center of the current iteration process being characterized by the mean value of all pixels in a corresponding partition in each color channel;

a first determination unit for pixel distance, configured to determine the pixel distance between the partition center of the current iteration process and the partition center of the previous iteration process;

a second determination unit for pixel distance, configured to calculate the pixel distance between each pixel and each partition center of the current iteration process if the pixel distance between the partition center of the current iteration process and the partition center of the previous iteration process is greater than a preset threshold; and a unit for classifying a pixel into a corresponding partition, configured to classify each pixel into a partition where the partition center of the current iteration process corresponding to the minimum pixel distance is located, until the pixel distance between the partition centers of two adjacent iteration processes is less than a preset threshold.

3. The apparatus according to claim 1, wherein the component determination module comprises:

a component determination sub-module configured to determine a maximum base pixel value and a minimum base pixel value in the partition, input the maximum base pixel value and the minimum base pixel value respectively into an objective function corresponding to each color channel of the partition to obtain the first component and the second component of the partition in each color channel;

wherein the objective function is obtained by performing straight line fitting on the components of the pixels of the partition in the corresponding color channels.

4. The apparatus according to claim 3, wherein the component determination sub-module comprises:

a base pixel value obtaining unit configured to obtain the base pixel value of a corresponding pixel according to an algebraic sum of the components of all color channels of each pixel in the partition; and a unit for determining a maximum base pixel value and a minimum base pixel value, configured to determine a maximum base pixel value and a minimum base pixel value from base pixel values of all pixels in the partition.

5. The apparatus according to claim 1, wherein the color index determination module comprises:

a quantized number determination sub-module, configured to determine a quantized number of the macro block according to the number of partitions of the macro block;

a target color channel determination sub-module, configured to determine a target color channel of the pixel in the corresponding partition; and a color index determination sub-module, configured to determine the color index of the pixel in the corresponding partition according to the quantized number of the macro block corresponding to the pixel, the component of the pixel in the target color channel, and the first component and the second component of the target color channel.

6. The apparatus according to claim 5, wherein the target color channel determination sub-module comprises:

a first parameter determination unit configured to, for any color channel, obtain a first parameter according to the difference between the component of the pixel in the corresponding color channel and the second component of the partition in the corresponding color channel;

a second parameter determination unit, configured to determine the difference between the first component of the partition in the corresponding color channel and the second component of the partition in the corresponding color channel, to obtain a second parameter;

a third parameter determination unit, configured to obtain a third parameter according to a ratio of the first parameter to a second parameter; and a target color channel determination unit, configured to determine that the color channel corresponding to the maximum third parameter is the target color channel corresponding to the pixel.

7. The apparatus according to claim 6, wherein the color index determination module comprises:

a first target parameter determination sub-module, configured to determine the difference between the component of the pixel in the target color channel and the second component of the target color channel to obtain a first target parameter;

a second target parameter determination sub-module, configured to determine the difference between the first component and the second component of the target color channel to obtain a second target parameter;

a third target parameter determination sub-module, configured to determine the ratio of the first target parameter to the second target parameter to obtain a third target parameter; and a color index determination sub-module, configured to determine the color index of the pixel in the corresponding partition according to the third target parameter and the quantized number.

8. An image compression method, comprising:

dividing a target image into one or more macro blocks;

partitioning each of the macro blocks, the pixel distance between any two pixels in different partitions being greater than a preset threshold;

for each partition, determining a first component and a second component of the partition in each color channel;

for each pixel, determining a color index of the pixel in a corresponding partition according to the first component and the second component of the corresponding partition of the pixel; and obtaining a preset image compression ratio, and for any macro block, compressing the macro block according to the number of partitions of the macro block, the first component and the second component of each partition in each color channel and color indexes of all pixels to obtain a compressed code stream corresponding to the macro block, wherein the partitioning each macro block comprises:

determining a partition center of a previous iteration process;

for each pixel, determining a pixel distance between the pixel and each partition center of the previous iteration process, and classifying the pixel into a partition where the partition center of the previous iteration process corresponding to a minimum pixel distance is located;

wherein, the partition center of the first iteration process is characterized by a combination of a maximum value of the component of any one color channel, a minimum value of the component of any one color channel, and a mean value of the component of any one color channel of all pixels.

9. The method according to claim 8, after classifying the pixel into a partition where the partition center of the previous iteration process corresponding to the minimum pixel distance is located, further comprising:

determining the mean value of components of all pixels in a same partition in each color channel;

updating the partition center of the previous iteration process to obtain the partition center of a current iteration process, the partition center of the current iteration process being characterized by the mean value of all pixels in a corresponding partition in each color channel;

determining the pixel distance between the partition center of the current iteration process and the partition center of the previous iteration process;

calculating the pixel distance between each pixel and each partition center of the current iteration process if the pixel distance between the partition center of the current iteration process and the partition center of the previous iteration process is greater than a preset threshold; and classifying each pixel into a partition where the partition center of the current iteration process corresponding to the minimum pixel distance is located, until the pixel distance between the partition centers of two adjacent iteration processes is less than a preset threshold.

10. The method according to claim 8, wherein the determining a first component and a second component of the partition in each color channel comprises:

determining a maximum base pixel value and a minimum base pixel value in the partition, inputting the maximum base pixel value and the minimum base pixel value respectively into an objective function corresponding to each color channel of the partition to obtain the first component and the second component of the partition in each color channel;

wherein the objective function is obtained by performing straight line fitting on the components of the pixels of the partition in the corresponding color channels.

11. The method according to claim 8, wherein the determining the color index of the pixel in a corresponding partition according to the first component and the second component of the corresponding partition of the pixel comprises:

determining a quantized number of the macro block according to the number of partitions of the macro block; determining a target color channel of the pixel in the corresponding partition; and determining the color index of the pixel in the corresponding partition according to the quantized number of the macro block corresponding to the pixel, the component of the pixel in the target color channel, and the first component and the second component of the target color channel.

12. An electronic device, comprising:

a memory;

a processor; and a computer program stored in the memory that when executed by the processor causes the device to implement the method according to claim 8.

13. A non-transitory computer-readable storage medium having a computer program stored thereon that, when executed by a processor, causes the processor to implement the method according to claim 8.

* * * * *